324-77.                SR 12-14-71        XR        3,627,920

[11] 3,627,920

[72] Inventors Manfred R. Schroeder
Mountainside;
Man M. Sondhi, Berkeley Heights, both of N.J.
[21] Appl. No. 813,236
[22] Filed Apr. 3, 1969
[45] Patented Dec. 14, 1971
[73] Assignee Bell Telephone Laboratories, Incorporated
Murray Hill, N.J.

[54] RESTORATION OF DEGRADED PHOTOGRAPHIC IMAGES

11 Claims, 3 Drawing Figs.

[52] U.S. Cl. .......... 178/6.8, 324/77 B, 333/70 T, 355/71
[51] Int. Cl. .......... H04n 7/18
[50] Field of Search .......... 178/6.8, 7.1 AC; 179/1 SA; 355/20, 52, 68, 80, 81, 84, 71; 340/146.1, 146.3; 333/70 T; 324/78 E, 77 B, 77 C, 77 D, 77 F

[56] References Cited
UNITED STATES PATENTS

| | | | |
|---|---|---|---|
| 3,388,377 | 6/1968 | Folsom et al. | 178/6.8 X |
| 3,420,955 | 1/1969 | Noll | 179/1 |
| 3,448,216 | 6/1969 | Kelly | 179/1 |
| 3,471,781 | 10/1969 | Shapiro et al. | 324/77 |

OTHER REFERENCES

" Image Evaluation and Restoration," Jorunal of the Optical Society of America– Vol. 56, No. 5, May 1966, pp. 569–574.

" Cepstrum Pitch Determination," Journal of the Acoustical Society of America– Vol. 41, No. 2, 1967, pp. 293–309.

" Short-Time Spectrum and Cepstrum Techniques for Vocal-Pitch Detection," The Journal of the Acoustical Soc. of Am., Vol. 36, No. 2, Feb. 1964 pp. 296-302.

" Restoration of Photographs Blurred by Image Motion," Bell System Tech. Jour., 12-1967, pp. 2353–2362.

*Primary Examiner*—Robert L. Griffin
*Assistant Examiner*—Richard K. Eckert, Jr.
*Attorneys*—R. J. Guenther and William L. Keefauver

ABSTRACT: Photographs which are blurred, for example, by uniform motion of a camera relative to an image during exposure, are restored by identifying certain parameters of the blurring, e.g., direction and displacement, using the parameters to transform the distortion into an additive periodic component in the picture (blur), and by estimating (or identifying) and subtracting the periodic components from the picture. Two-dimensional spectral analysis, or the cepstrum technique, may be employed to identify the blur parameters, and a transversal filter arrangement, adjusted in accordance with parameter values is used to perform the estimation and subtraction.

INVENTORS M. R. SCHROEDER
M. M. SONDHI
BY C. E. Hirsch Jr.
ATTORNEY

RESTORATION OF DEGRADED PHOTOGRAPHIC IMAGES

FIELD OF THE INVENTION

This invention concerns the restoration of photographs that have been degraded during exposure, for example, because of relative motion between the camera and the scene being photographed. In particular, the invention concerns apparatus for and the method of processing a distorted picture without a prior knowledge of the content of the undistorted picture or of the direction and extent of the blurring. It is an object of the invention to achieve image restoration quickly and efficiently without resort to a prior information.

BACKGROUND OF THE INVENTION

The restoration of degraded photographic images has elicited considerable interest during the past few years. Among the important types of degradation that are frequently encountered are those resulting from atmospheric turbulence, imperfect imaging systems, additive noise, camera motion, and the like. Such degradation frequently occurs in installations in which an unattended camera is remotely operated to photograph a scene, for example, those in which an unattended camera is carried in a moving vehicle such as a spacecraft. In a sampled data system, some restoration improvement has been achieved by treating individual samples of the image in accordance with a probability matrix. At most, this results in a sharpening of the image conveyed by data samples but does not correct for gross degradation which transcends sample element distortion.

SUMMARY OF THE INVENTION

In accordance with this invention, photographs which are blurred, for example, by uniform motion of a camera relative to an image during exposure, are restored without prior information of the content of the photograph or of the blurring parameters. Parameters concerning the direction of blurring and the extent or displacement of blurring are ascertained and used to reduce (or transform) any blurring of the picture to a superposed periodic component in the picture. In essence, the desired picture is then treated as a noise component in a periodic field. The periodic component is finally estimated (or identified) and subtracted from the composite picture to leave a replica of the original scene.

In a preferred embodiment of the invention, parameter identification is carried on by performing a two-dimensional spectrum analysis using, for example, the so-called cepstrum technique. A blurred picture is subjected to cepstrum analysis in each of a plurality of different relative orientations, and the orientation giving rise to the largest cepstral peak is chosen as the one for which parameter data is compiled. The cepstrum analysis provides sufficient information to identify the orientation, and magnitude of the displacement of the image relative to a photographic plate during exposure. Based on these parameters, the blurred image is transformed into the original undistorted picture with an additive periodic component. The periodic component, or an estimate of it, is then subtracted from the picture.

Apparatus used to carry out the unique steps of the restoration method to yield a facsimile of the original scene may, for example, employ a transversal filter arrangement adjusted in accordance with the parameter definition of the periodic component. Preferably, however, the entire system of processing, in accordance with the invention, is carried out on a specially programmed digital computer. The choice of the mode of practicing the invention obviously depends upon the type of installation and the frequency with which restoration operations must be carried out.

DESCRIPTION OF THE DRAWINGS

The invention will be fully apprehended from the following detailed description of illustrative embodiments thereof taken in connection with the appended drawings in which.

DETAILED DESCRIPTION

Analytical Considerations

Figure 1:
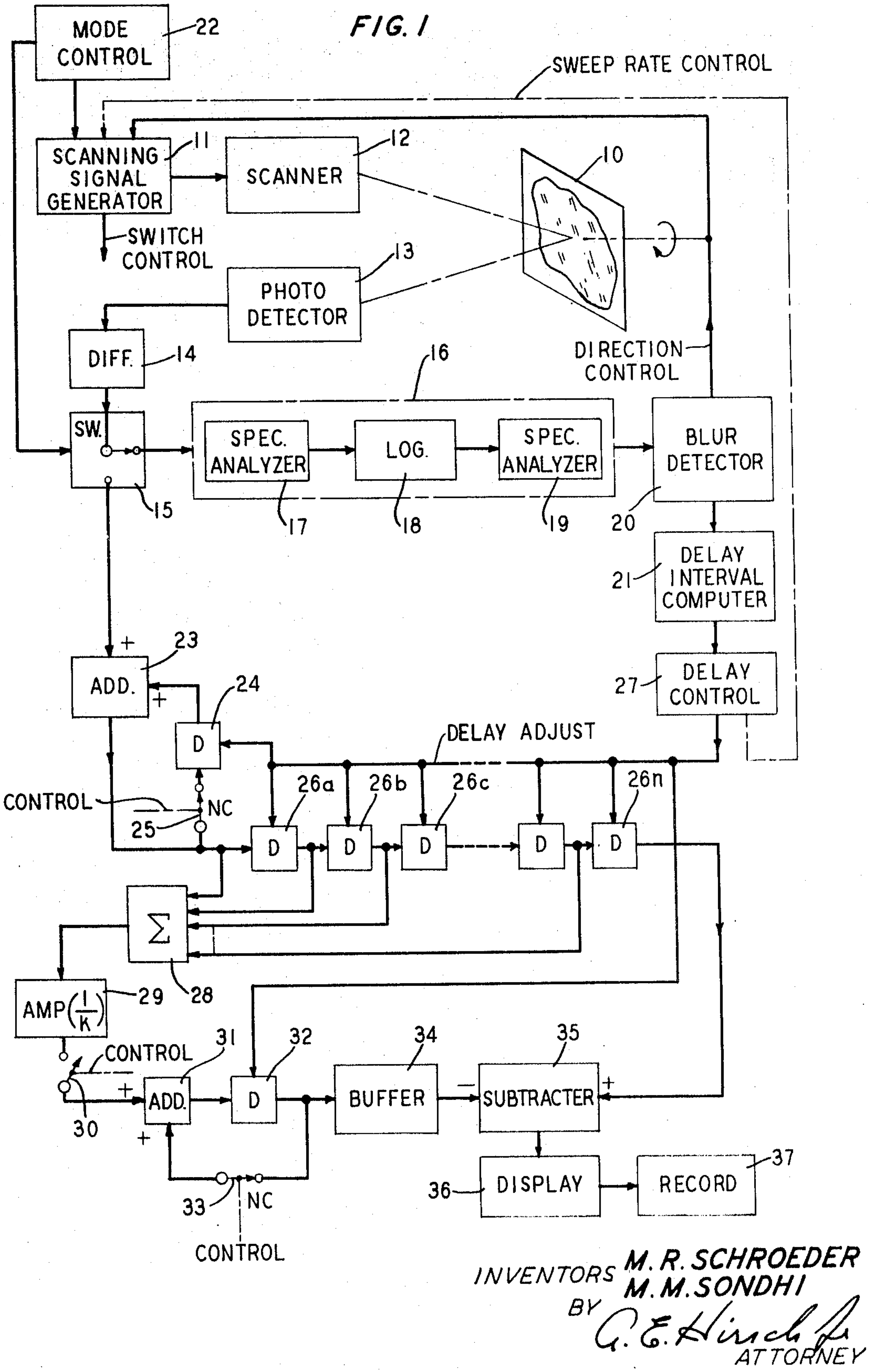
FIG. 1 is a block schematic diagram of apparatus suitable for carrying out the processing function of the invention.

As an aid in understanding the principles of the invention, it will be assumed for simplicity that motion in the image plane of a camera with respect to a static image is along an $x$-axis and occurs at a constant velocity $v$ feet per second. It is further assumed that the exposure duration is T seconds and that shutter action is essentially instantaneous. Accordingly, if $p(x)$ represents the original, unblurred image scene, the total exposure of the image at a point $x$ may be expressed as:

$$b(x)=c_1\int_0^T p(x-vt)\,dt = c_2\int_{x-a}^{x} P(\xi)\,d\xi \qquad (1)$$

In the equation, $c_1$ and $c_2$ are constants, $a=vt$ represents the total distance moved by the camera during exposure, and $\xi$ represents a dummy variable of integration. The density of the photograph is some monotonic function $r(\cdot)$ of $b(x)$. If $r(\cdot)$ is known, then $b(x)$ can be obtained from the photograph. Absorbing the constant $c_2$ into $r(\cdot)$, the problem may be stated as follows: recover $p(x)$ in a range $0\leq x\leq$L from the blurred image $$b(x)\int_{x-a}^{x} p(\xi)\,d\xi 0\leq X\leq L \qquad (2)$$

It is assumed in this analysis that $a$ is known. Estimation of $a$ as well as the direction of motion from the blurred picture is treated later in the analysis.

It has been shown by D. Slepian in a paper entitled "Restoration of Photographs Blurred by Image Motion," published in the Bell System Technical Journal for Dec. 1967, beginning at page 2,353, that unique recovery of an image $p(x)$ from a degraded, e.g., blurred, rendition of it, $b(x)$, is possible if, and only if, sufficient information is known about the original image and the manner by which the original has been degraded. If such information is not known a priori, then infinitely many scenes may be reconstructed, each of which would give rise to a similar degraded image except for an additive constant. In a situation where a small object, whose blurred image is smaller than the photographs, is being photographed against a uniform background, sufficient information is known about the photograph to permit a reasonably good reconstruction. However, in some cases information about the image is not even approximately known for any interval. Even though unique reconstruction is impossible for such cases, we have found that good approximations to the original picture can be obtained without a priori knowledge.

Thus, it is in accordance with this invention to process blurred signal information in such a fashion that a unique reconstruction of the original image is obtained. The form of processing involves an analysis of the blurred image to identify the blurred component in terms of a periodic signal in which is embedded an image signal, the situation being not unlike a noise component contained in a periodic signal. This concept may be explained as follows: equation (2), which represents the relationship between a blurred image and the original, undistorted scene, is differentiated to yield $$b'(x)=p(x)-p(x-a) \text{ a) } 0\leq x \text{ L.}\leq (3)$$

It is convenient to distinguish $p(x)$ in the region $-a \leq x \leq 0$ from the rest. Thus, let $$Q(x)=p(x-a)\ 0 \leq x < a = 0 \qquad \text{elsewhere.} \quad (4)$$

If L is made equal to $Ka+\epsilon$ (with $\epsilon \leq a$), then by repeated use of equation (3), $$p(x)=b'(x)+Q(x),$$
$$p(x+a)=b'(x+a)+p(x), \text{ and } (5)$$
$$p(x+Ka)=b'(x+Ka)+p(x+Ka-a).$$

Each of the equations (5), except the last, is valid over the range $0 \leqslant x \leqslant a$. The last equation is over the range $0 \leqslant x < \epsilon$. By adding the first $m$ of the equations (5), $$p(x)+ma)=\sum_{k=0}^{m} b'(x+Ka)+Q(x)\ 0\leq x\leq a \quad 0\leq m<K \quad (6)$$

Again, for $m=K$, $0 \leqslant x < \epsilon$. Equation (6) can be written more compactly as $$p(x)\sum_{n=0}^{N} b'(x-na)+Q(x(\mathrm{mod}\ a))\ 0\leq x\leq L$$

or $$p(x)=f(x)+Q(x(\mathrm{mod}\ a)), \quad (7)$$

where N is the integer part of $x/a$.

The function $f(x)$ can be computed from the blurred picture, since it involves values of $b'(x)$ in the given range $0 \leq x \leq L$. The desired undistorted picture, $p(x)$, differs from $f(x)$ by a periodic function, $Q(x(\mathrm{mod}\ a))$. The problem thus reduces to an estimation of Q. With Q known, of course, $p(x)$ can be exactly reconstructed.

If $p(x)$ is regarded as "noise," then the estimation of Q, given $f$, is a problem much studied in communication theory. Optimum estimates can be derived depending upon a priori statistical knowledge about $p(x)$. In general, the statistical information required by these estimators is not available. However, from equation (7) it is found that $$Q(x)=-\frac{1}{K}\sum_{m=0}^{K-1} f(x+ma) + \frac{1}{K}\sum_{0}^{K-1} p(x+ma),\ 0\leq x< a \quad (8)$$

The second summation on the right side of equation (8) is the average value $\bar{p}$ of $p(x)$ and may be assumed to be independent of $x$. This assumption clearly breaks down when $p(x)$ has periodic components with period $a$, or when the number of periods, K, is too small. Nevertheless, on this assumption, an estimate $\hat{Q}(x)$ of $Q(x)$ may be formed:

$$\hat{Q}(x)=-\frac{1}{K}\sum_{m=0}^{K-1} f(x+ma)+\bar{p} \quad (9)$$

and the corresponding estimate $\hat{p}(x)$ of $p(x)$:

$$p(x)=f(x)+\frac{1}{K}\sum_{0}^{K-1} f(x+ma)+\bar{p} \simeq f(x)+\frac{1}{K}\sum_{0}^{K-1} f(x+ma)+\bar{b}/a \quad (10)$$

The estimate (9) can be shown to be the best estimate in the maximum likelihood sense, if $p(x)$ is a member of a white gaussian random process. For simplicity, the estimate on $f(x)$ is based on the interval $(O,L-\epsilon)$ rather than on the interval $(O,L)$.

Although the assumptions leading to equation (10) appear to be rather drastic, it has been found in practice that excellent reconstructions can be made by this method.

Implementation

These theoretical considerations are turned to account in accordance with the invention by initially determining the direction and extent of blurring in a photograph or the like and by utilizing these data to develop a blur signal component which is separated from the photograph to leave the desired picture image.

The apparatus listed in FIG. 1 is suitable for performing the necessary steps. Photograph 10 is analyzed to develop video signal counterparts of the information in it, for example, by means of a flying spot scanning arrangement. Scanning may, of course, be achieved in any desired fashion as by moving the picture past an aperture, moving a physical aperture, or by electromagnetic deflection of a beam in an image disector or other camera tube. In the illustrated apparatus, scan signal generator 11 is employed to control cathode ray scanner 12 which projects a moving beam on the surface of photograph 10. Photodetector 13 recovers the modulated beam and develops video signals corresponding to the pictorial information.

Since it is evident from equation (3) that the blurred picture represented by the video signals is in the form of a signal together with an echo of the signal, it is in accordance with the invention to treat the composite signal as a signal plus echo and to analyze it to seek out the echo and its time of occurrence. Equation (3) sets forth the relationship for the differentiated composite signal $b'(x)$. Accordingly, signals from detector 13 are passed through differentiator 14 prior to further processing.

Suppose, first, that the direction of blurring of photograph 10 is known so that only the extent $a$ of the blur must be determined. Photograph 10 is scanned in the direction of blurring and the resulting differentiated video information is supplied by way of switch 15 to analyzer 16. Preferably switch 15 is actuated automatically by a signal from mode control 22. Analysis of a signal and its echo(es) is most effectively accomplished by means of the so-called "cepstrum" technique described, for example, by A. M. Noll in the *Journal of the Acoustical Society of America* for Feb. 1964, at page 296. The word cepstrum is used in the art to denote the spectrum of the logarithm of the spectrum of a signal, and the cepstrum technique may be summarized as follows: The Fourier transform of the differentiated composite signal (signal plus blur) $b'(x)$ is $$B(w)=\int_0^L p(x)e^{-jwx}dx\int_0^L p(x-a)e^{-jwx}dx = (l-e^{-jwa})\int_0^{L-a} p(x)e^{-jwx}dx + \int_{L-a}^{L} p(x)e^{-jwx}dx - \int_{-a}^{0} p(x)e^{-jwx}dx \quad (11)$$

If the last two terms are neglected, then the inverse Fourier transform of $\log|B(w)|$ is given by $$C(x)=F^{-1}[\log|B(w)|]\cong F^{-1}\left[\log\int_0^{L-a} p(x)e^{-jwx}dx\right] - \sum_{1}^{\infty}\frac{1}{n}[\delta(x-na)+\delta(x+na)] \quad (12)$$

Figure 2:
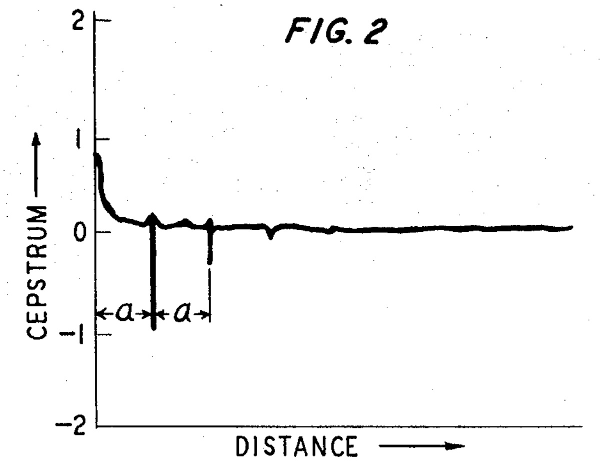
FIG. 2 is a pictorial representation of cepstrum data used in defining blur parameters in accordance with the invention.

$C(x)$ is defined as the cepstrum of $b'(x)$ and the indicated series of spikes gives an accurate measurement of $a$. FIG. 2 shows such a cepstrum display.

To carry out the cepstrum analysis, analyzer 16 employs a spectrum analyzer 17, a logarithmic amplifier 18, and a second spectrum analyzer 19. The series of spikes in the signal output of analyzer 16, of the form shown in FIG. 2, define the extent of blurring, namely, parameter $a$. Blur detector 20 responds to the cepstrum signal and develops a signal in response to the largest cepstral peak supplied from analyzer 16. Apparatus suitable for performing this function is described in A. M Noll, U.S. Pat. No. 3,420,955, dated Jan. 7, 1969. The signals $A_j$ and $Q_j$ developed by the apparatus shown in FIG. 1 of the Noll apparatus define the magnitude and time of occurrence, respectively, of the largest peak in the cepstrum. Selected signal data from detector 20 is supplied to delay interval computer 21 wherein a signal proportional to $a$, the interval between cepstral peaks, is developed.

In the event that the direction of blurring in photograph 10 is not known a priori, it is in accordance with the invention to repeat the process described above in each of a plurality of orientations of photograph 10 with respect to the direction of scanning and to select that orientation which yields the largest cepstral peaks as indicative of the direction of blurring. Effective repositioning of the photograph may be achieved in a number of ways, for example, in response to clock pulses issued regularly at intervals in excess of the time required for processing, but preferably is done in response to data from detector 20. For example, at the conclusion of each analysis, display 10 may be rotatably shifted physically or, alternatively, the direction of scanning may be shifted by altering the program of scan signal generator 11 as called for by data from detector 20. These alternative actions are indicated symbolically in the drawing; techniques well known to those skilled in the art may be employed to effect the called-for action. Results of the cepstrum analysis for each of the plurality of directional scans are stored, for example, in apparatus (not shown) associated with blur detector 20. Eventually, the analysis containing the largest peaks is selected as indicative of the direction of blur. Once the blur direction is found, photograph 10 is oriented in the direction of blur for subsequent scanning.

Preferably, a determination of both the direction and extent of blurring in the photograph is achieved by performing a two-dimensional cepstrum analysis such that detector 20 is supplied with information concerning both the orientation and extent of blur in one operation. As is well known, a two-dimensional cepstrum analysis involves a first two-dimensional spectrum analysis, e.g., using a two-dimensional Fourier analysis, and a second two-dimensional analysis of the logarithm of the first analysis. With such an analysis, a series of spikes in the cepstral display occur along the direction of blur, and are spaced by an amount equal to the total displacement of the camera, i.e., to the blurring distance $a$. Two-dimensional Fourier transform methods are well known to those skilled in the art. For example, a technique for determining both the direction and extent of blur in a photograph is described in the above-cited Slepian paper on the basis of a two-dimensional Fourier analysis. Similarly, two-dimensional Fourier techniques are described in the texts "Systems and Transforms with Applications in Optics" by A Papoulis, McGraw-Hill Inc., 1968, for example at page 89 et seq., and "Introduction to Fourier Optics" by J. W. Goodman, McGraw-Hill Inc., 1968, for example at pages 4 et seq. and 134 et seq. The two-dimensional cepstrum analysis is used in accordance with this invention, however, because cepstral peaks yield superior indications of parameter values, i.e., afford greater precision of parameter identification than available with a two-dimensional Fourier analysis. A convolution operation may also be employed to achieve like results.

Once the blur parameters have been determined, mode control 22 is actuated, for example, in response to a signal from computer 21 (connection not shown), to transfer differentiated video signals from the scanner system via switch 15 to a transversal filter system arranged to develop a signal corresponding to the periodic blur components in the composite video signal. Differentiated video signals are initially supplied to an accumulation loop including adder 23, delay element 24, and normally closed switch 25. Delay element 24 is adjusted to exhibit a delay of T seconds, equal to the time required by the scanning system to traverse the photograph 10 for a distance equal to the predetermined blurring interval $a$. Delay 24, and indeed all of the other delay elements employed in the processing apparatus, are adjusted at the beginning of this mode, to present a delay of T seconds in response to control signals supplied by delay control 27. Although any form of adjustable delay element may be employed, one convenient one employs a so-called domain wall arrangement as described, for example, in a copending application of R. N. Kennedy now U.S. Pat. No. 3,460,045, granted Aug. 5, 1969. Such an arrangement permits the extent of delay to be adjusted over a considerable range in response to an externally applied signal. Alternatively, an effective change in delay may be achieved with fixed element delay units by altering the rate of scanning, for example, by adjusting the program of scan signal generator 11. Such control is illustratively indicated in the figure by the dashed sweep rate control line from delay control unit 27 to generator 11. Preferably, both techniques are employed together, i.e., a change in the delay time exhibited by each delay unit is adjusted together with a change in the rate of scanning. Obviously, this combination affords precise control over an appreciable range.

Video signals passing through adder 23 accordingly have added thereto a delayed replica of the previous T seconds of signal, corresponding to the scanned photographic interval of the previous periodic blur portion. So long as switch 25 is closed, successive T second intervals of incoming signal have all previous intervals added thereto such that a summation of blur intervals is developed in accordance with the relationship set forth previously in equation (6). The output signal developed by adder 23 is delivered to transversal filter arrangement 26 comprising interval delay elements $26_a$, $26_b$, $26_c$, ..., $26_n$, with each delay interval adjusted as discussed above to represent a delay of T seconds. With this arrangement, the first T second interval delivered from adder 23 progresses through the delay line system eventually to be stored in delay element $26_n$. Delay element $26_{n-1}$ evidently contains the summation of first and second T second intervals, and so on, with delay element $26_a$ containing a summation of all K of the T second intervals in one scanned line of photograph 10, i.e., the number K of blurring distances $a$ contained in each line developed in scanning photograph 10.

With these accumulations of blur interval signals available, it is possible to estimate the periodic signal component Q in accordance with the relationship set forth in equation (8). Accordingly, signals from the inputs to each of the elements of delay system 26 are supplied to algebraic combining network 28 to produce a summation signal which is delivered via amplifier 29 and momentarily closed switch 30 to an accumulation network including adder 31, delay element 32 and normally closed switch 33. In accordance with equation (8), the estimation of the periodic component Q requires that an average value be obtained in proportion to the number of K strips of width $a$ developed in scanning photograph 10. This reduction is achieved by amplifier 29 adjusted to exhibit a gain $l/K$. With switch 30 closed, by virtue of a signal from scanning signal generator 11 indicating that a full line of photograph 10 has been scanned, the accumulated signal developed during the last T second interval enters the accumulation loop where it is circulated and stored in delay element 32. This signal represents $Q(x(\text{mod } a))$ as found in equation (7). It is a close replica to the periodic blur signal in photograph 10 and is repeatedly delivered by way of buffer 34, such as a DC blocking element, to the negative input of subtracter 35. In accordance with equation (7), the processed video signal from transversal filter 26 is supplied to the positive input of subtracter 35 so that the difference constitutes an output signal which is proportional to the intensity of the desired photograph devoid of blur. Since both the positive and negative input signals have passed through delay system 26, the two signals are in synchronism and may be subtracted directly. The difference signal, $p(x)$, is available for any desired use, for example, to actuate display device 36 for instantaneous visualization of the restored photograph, or for producing a permanent record in recorder 37. Any form of recording system, such as a facsimile recorder, camera system or the like, may be employed.

To permit each successive line scan of photograph 10 to be processed, a control signal from scan signal generator 11 opens normally closed switch 25 and normally closed switch 33 for the last T second interval of each line scan. This operation effectively clears the associated accumulation loop so that, upon reclosure of the switches, the loops are available to accumulate T second intervals of the next successive line scan. As noted above, switch 30 is held closed only at the end of each complete line scan to supply the accumulated periodic component to the associated storage loop.

It is apparent that the apparatus of FIG. 1 effectively carries out the operations prescribed in the theoretical analysis previously given. Evidently, all of the operations may be carried out on a digital or analog basis and preferably are carried out digitally entirely by way of a programmed computer.

Figure 3:
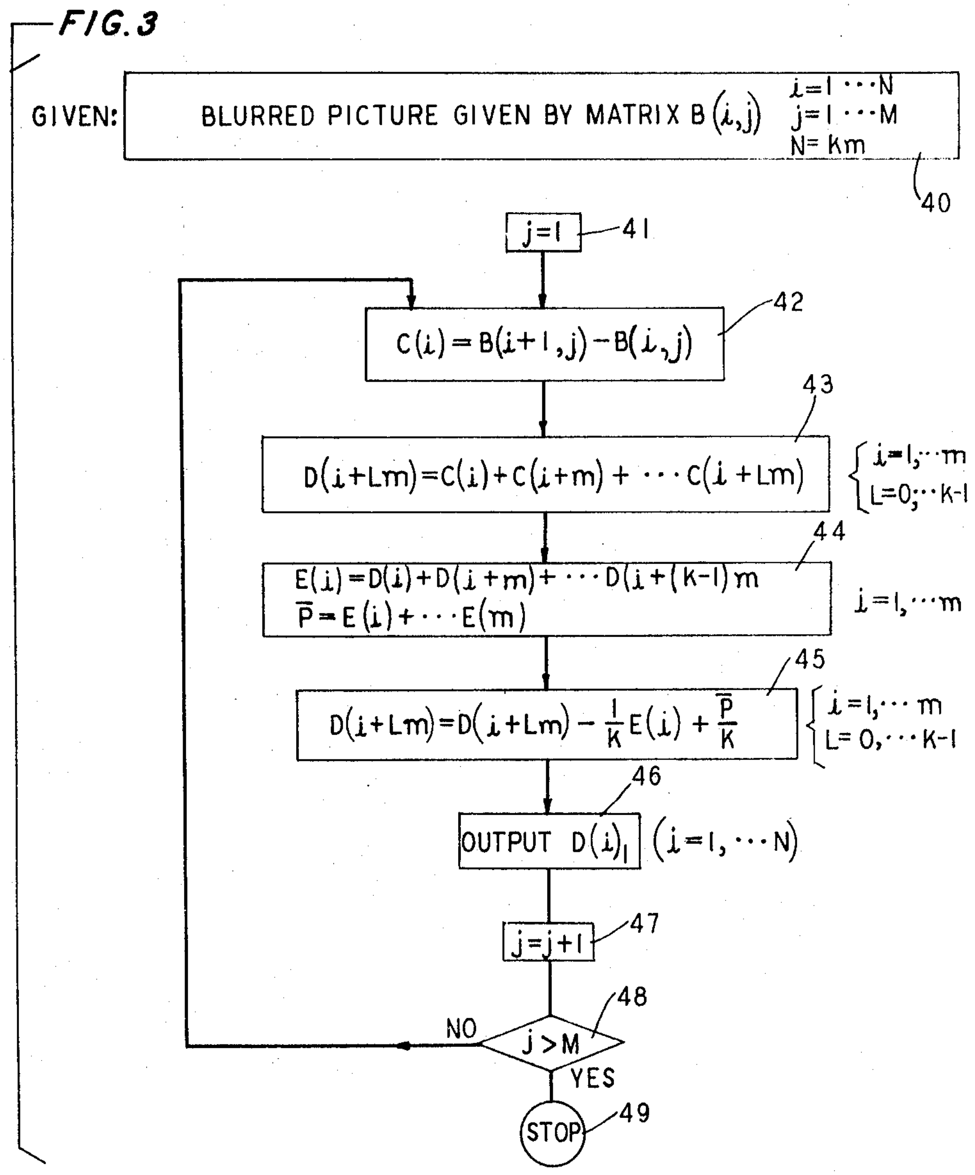
FIG. 3 is a flow chart defining the novel steps for performing the restoration operation of the invention.

FIG. 3 illustrates, in flow chart form, the required computer operations. It is assumed that picture information is established by representing a photograph by a matrix of intensity values, $B(i,j)$, where $i$=1...N and $j$=1...M. In one such simulation, for example, a digital version of a photograph with a 992 ×900 matrix of eleven bit numbers was sufficient to represent intensity values on an equispaced square lattice. In FIG. 3, it is assumed that the blur distance is $m$ samples and N=K$m$ where $m$ is equal to $a$ or T. Given these input data, processing is carried out as indicated in the flow diagram for each successive line of the photograph. The derivative of the input signal is computed in block 42, successive accumulated sequences of T second intervals are developed by the program of block 43. The blur component Q is computed in accordance with equation (9) via the operations indicated in block 44, and the restored picture elements are computed in accordance with equation (7) via block 45. Program elements, indicated by blocks 46, 47 and 48, constitute an iterative decision loop which permits the program to run continuously for each successive scanned line until the index $j$=M has been reached at which time the process is stopped, symbolically in block 49, and the resultant output data is ready for use. It is apparent that the output of the processing consists of M sequences of N samples each, which represent the M lines of the unblurred picture in order.

It is evident that any one skilled in the art of computer programming can, following the flow chart of FIG. 3, implement a program sufficient to enable the relationships set forth in the equations contained in the analytical analysis section of this specification, prepare a running program for carrying out the principles of this invention. Other programs following the same inventive principle will, of course, occur to those skilled in the programming art.

What is claimed is:

1. The method of restoring photographs blurred because of linear motion of a camera relative to an image during exposure, which comprises the steps of:
   - analyzing a photograph to develop a video signal counterpart thereto,
   - developing a parameter signal to identify the extent of blurring in said photograph,
   - transforming said parameter signal into additive periodic signal components which correspond to blur components in said video signal,
   - identifying the magnitude and period of said periodic signal components, and
   - subtracting said periodic signal components from said video signal,
   - an electrical signal representation of the information in said photograph,
   - means for analyzing said representation in each of two orthogonal directions to produce signals which denote cepstral peaks in said representation,
   - means for selecting the direction which exhibits a series of large cepstral peaks as an indication of the direction of blurring in said photograph, and
   - means for measuring the interval between cepstral peaks in said signal representation to produce an indication of the extent of blurring in said photograph.

2. The method of restoring photographs as defined in claim 1, wherein the analysis of said photograph to develop a video signal takes place by repetitive scanning of said photograph in the direction of blurring.

3. The method of restoring photographs as defined in claim 2 wherein said signal representative of said parameter of blurring is developed by,
   - performing a spectrum analysis on said video signal, and
   - by measuring the interval between highest amplitude spectral signals.

4. The method of restoring photographs as defined in claim 2 wherein said signal representative of blurring is developed by,
   - performing a cepstrum analysis of said signal representative of said photograph, and
   - employing a measure of the interval between major cepstral peaks to identify the extent of blurring.

5. The method of restoring photographs as defined in claim 2, wherein, said parameter signal is transformed into additive periodic components by passing said video signal through a transversal filter arrangement adjusted in accordance with said parameter signal value.

6. The method of identifying the direction and extent of blurring in a photograph blurred because of relative motion between the camera and scene being photographed, which includes the steps of:
   - scanning a photograph to produce a video signal counterpart thereof,
   - performing a two-dimensional cepstrum analysis of said video signal, identifying the direction of blurring in said photograph from the direction in said two-dimensional cepstrum which exhibits a plurality of cepstral peaks, and
   - employing a measure of the interval between major cepstral peaks to identify the extent of blurring 7. The method of restoring photographs blurred because of uniform linear motion of a camera relative to an image during exposure, which comprises the steps of:
   - scanning a photograph linearly to produce an electrical signal representation of said photograph,
   - performing a two-dimensional cepstrum analysis on said signal representation,
   - identifying the direction of blurring in said photograph as the direction in said cepstrum analysis in which a plurality of large cepstral peaks are evident,
   - identifying the extent of blurring in said photograph from a measure of the interval between major cepstral peaks in said analysis
   - developing parameter signals to identify the identified direction and extent of blurring in said photograph,
   - transforming said parameter signals into additive periodic components which correspond to blur components in said signal representation of said photograph,
   - subtracting said additive periodic components from said electrical signal representation of said photograph in the direction of the blurring, and
   - developing a visual image from the resulting difference signal.

8. Apparatus for determining the direction and extent of blurring in a photograph blurred because of motion of a camera relative to an image during exposure, which comprises;
   - means for scanning a photograph to produce an electrical signal representation of the information in said photograph,
   - means for analyzing said representation in each of two orthogonal directions to produce signals which denote cepstral peaks in said representation,
   - means for selecting the direction which exhibits a series of large cepstral peaks as an indication of the direction of blurring in said photograph, and
   - means for measuring the interval between cepstral peaks in said signal representation to produce an indication of the extent of blurring in said photograph.

9. A system for restoring photographs blurred because of motion of a camera relative to an image during exposure, which comprises:
   - means for scanning a photograph in the direction of blurring in said photograph to produce an electrical signal representation of said photograph, a transversal filter including a tandem connection of individually adjustable delay elements, means for adjusting the delay exhibited by each of said individual delay elements to an interval proportional to the extent of blurring in said photograph, means for directing said electrical signal representation through said adjusted filter to produce a signal replica of periodic blur components in said photograph, means for synchronously subtracting said replica signal from said electrical signal representation to produce a difference signal, and means responsive to said difference signal for reconstituting said photograph.

10 A system as defined in claim 9, wherein, said means for adjusting the relative delay exhibited by said delay elements includes means for altering the rate of scanning said photograph.

11. The method of restoring pictures blurred because of uniform linear motion of a camera relative to an image during exposure which comprises the steps of:

representing each of a plurality of scans in the direction of blur in a blurred picture by intensity values $b(x)$;

evaluating a blur component Q for each of said scans in accordance with the relation $$\hat{Q}(x) = -\frac{1}{K}\sum_{m=0}^{K-1} f(x+ma)+\bar{p}$$

where $\bar{p}$ represents an average value of a representation of the original unblurred image scene $p(x)$ of said picture, $a$ represents the number of intensity values in a blur interval, K represents the number of blur intervals in one scan in the direction of blur in said picture, and in which $f(x)=$ $$\sum_{n-0}^{N} b'(x-na)$$

--- where N is the integer part of $x/a$, $b'$ represents the derivative of $b(x)$, and $n$ represents a selected integer;

evaluating the value of said original unblurred image scene $p(x)$ in accordance with the relation $p(x) = f(x) + Q(x(\text{mod } a))$, where $x(\text{mod } a)$ is the remainder upon dividing $x$ by $a$; and developing a pictorial display in accordance with the intensity values represented by said values $p(x)$.

* * * * *

UNITED STATES PATENT OFFICE

CERTIFICATE OF CORRECTION

Patent No. 3,627,920 Dated December 14, 1971

Inventor(s) Manfred R. Schroeder and Man M. Sondhi

It is certified that error appears in the above-identified patent and that said Letters Patent are hereby corrected as shown below:

Col. 3, equation (6) after "x" (first appearance) delete ")".

Col. 4, equation (11) line 46 after dx and before $\int$ insert a minus sign.

Col. 7, line 25 change "Q" to "$\hat{Q}$".

Claim 1, line 60 after "signal" change the comma to a period;

Claim 1, lines 61 to 72 beginning with "an" and ending with "photograph" should be deleted.

Signed and sealed this 13th day of June 1972.

(SEAL)
Attest:

EDWARD M.FLETCHER,JR.
Attesting Officer

ROBERT GOTTSCHALK
Commissioner of Patents